Feb. 8, 1949.　　　　R. O. LEWIS　　　　2,461,067
LIQUID FERTILIZER APPARATUS
Filed April 23, 1945
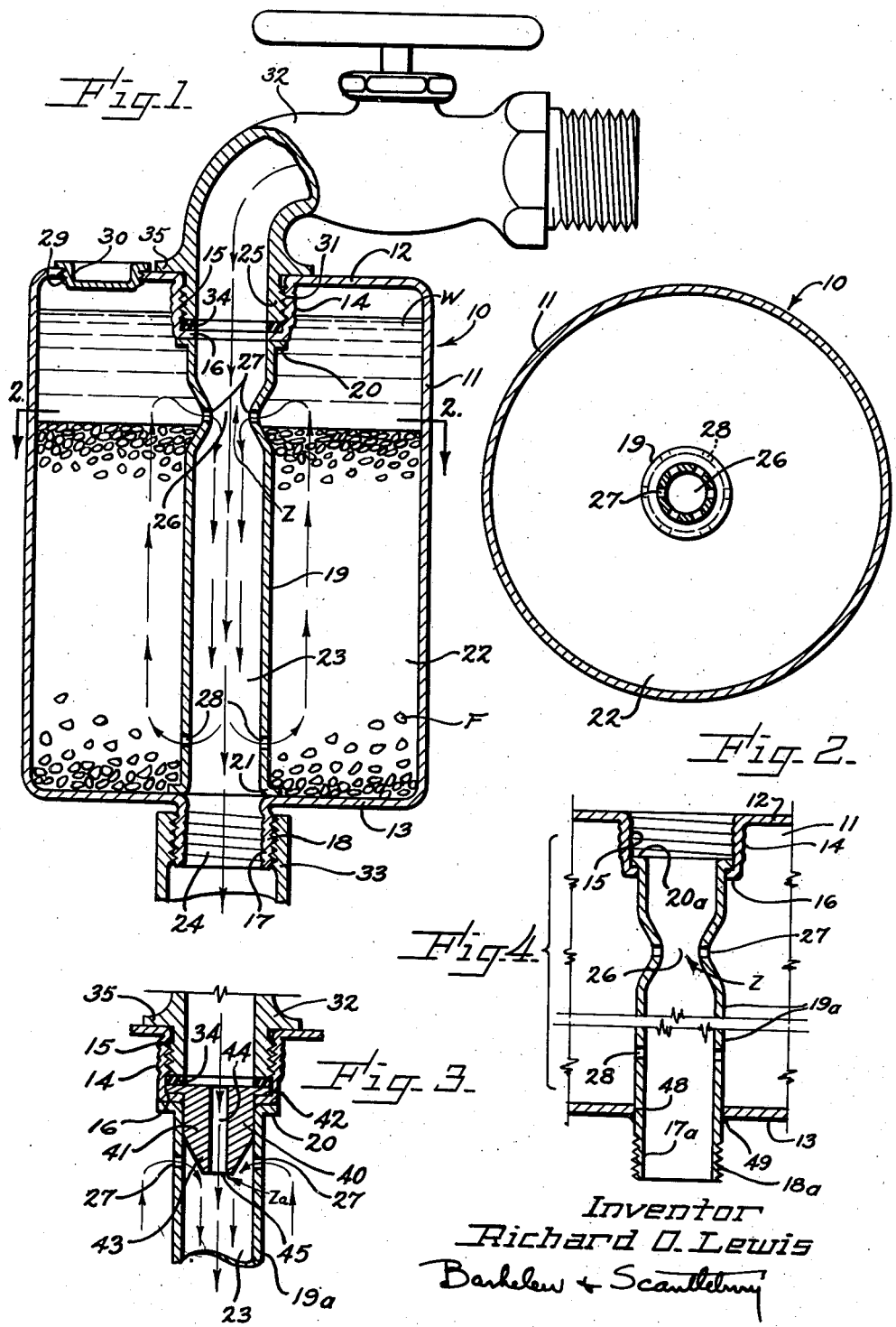
Inventor
Richard O. Lewis
Barkelew & Scantlebury
Attys.

Patented Feb. 8, 1949

2,461,067

UNITED STATES PATENT OFFICE 2,461,067

LIQUID FERTILIZER APPARATUS

Richard O. Lewis, Los Angeles, Calif.

Application April 23, 1945, Serial No. 589,908

7 Claims. (Cl. 299—83)

This invention relates generally to fertilizer apparatus and is more particularly directed to apparatus whereby, for instance, soluble chemical fertilizer, supplied in granular or crystalline form and packaged in a container, is adapted to be dissolved, intermixed with and distributed by a water stream flowing through the container.

Thus, by connecting the container into a garden-hose line or the like, chemical fertilizer in liquid form may be distributed evenly and in proper proportionate amount over a lawn or garden coincidently with the watering operation. Or, of course, the container may be filled with soluble insecticides or fungicides and introduced into a water-spray line for spraying foliage etc. with a proper mixture of water and treating chemical. Among other uses, the apparatus may be employed for distributing weed killing solutions.

It is the general object of the invention to provide a device of the class described which is of utmost structural and operational simplicity and yet is fully efficient in performing the functions outlined above. The apparatus is adapted for quick and easy installation in a flow line, and may as quickly and easily be disassociated from the flow line to restore the latter to normal condition.

While the container is adapted to be refilled with chemical after the original charge has become exhausted, it is of such a simple and relatively inexpensive nature that it is economically feasible to market it as a non-refillable or expendable dispenser. In other words the dispensing container is not much more expensive than an ordinary packaging container, which has to be supplied in any event, and therefore the additional cost is so slight that the consumer is willing to buy a new, filled device each time he wishes to fertilize or otherwise treat a lawn surface or foliage.

Other objects and features of novelty will be apparent from the following detailed description, reference being made to the accompanying drawings, in which:

Fig. 1 is a longitudinal medial section through a device embodying the invention, a conventionally illustrated faucet and hose coupling being shown in connection therewith;

Fig. 2 is a section on line 2—2 of Fig. 1;

Fig. 3 is a fragmentary section of a portion of the device showing a variational type of diametrical restriction in the flow tube; and Fig. 4 is a fragmentary section showing a variational mounting for the central tube of the apparatus.

The container, generally indicated at 10 consists of a cylindrical casing 11, having top and bottom walls 12 and 13, respectively. Depressed from top 12 is a tubular neck 14, into which are pressed internal threads 15. An internal annular flange 16 is formed at the bottom of neck 14.

Pressed outwardly from bottom 13 and in axial alinement with neck 14 is a tubular neck 17 having external, pressed threads 18. It will be noted that the two necks are formed integrally with their associated walls, the cost and complexity of manufacture thus being materially reduced.

Vertical tube 19, having terminal, external annular flanges 20 and 21, extends from neck to neck and, with casing 11, defines an annular chamber 22. Tube bore 23 is in line and in direct communication with the bores 24 and 25 of necks 17 and 14, respectively. The tube is secured to the container in any suitable manner. For instance, tube flange 20 may abut and be soldered to the underside of neck-flange 16; and tube flange 21 may be soldered directly to the upper face of bottom 13. The soldered joints between the tube and container prevent leakage at their points of junction, and the tube acts to internally reenforce the container against longitudinally directed collapsing stresses.

Near its upper or inlet end, tube 19 is formed with a diametrical restriction in the form of Venturi passage 26, ports 27 opening from chamber 22 to tube bore 23 at or near the point of greatest restriction. Near the bottom or discharge end of tube 19 are ports 28 which open from tube bore 23 to chamber 22.

A filling opening 29 is normally closed by cap 30, chamber 22 being filled through opening 29 with water soluble grains, crystals or pellets of chemical fertilizer, insecticide or fungicide, etc. The chemical substance, in solid form, is designated at F. Preferably, though this is not an operational limitation, chamber 22 is filled to about the level of ports 27. Ammonium sulphate, copper sulphate crystals, magnesium sulphate and calcium nitrate (all usually in crystalline form) are examples of chemicals which may be used to advantage in a device of the character described.

For storage and shipment purposes, the bores of necks 14 and 17 may be sealed by removable screw-closures (not shown).

While it is broadly contemplated that the container may be detachably connected into any suitable zone of a watering or flow line, the drawings illustrate a preferred point of connection or installation. Thus, neck 14 is adapted to be screwed directly onto threads 31 of water faucet 32, while neck 17 is adapted to receive a complementarily threaded hose coupling 33 carried at the end of an ordinary garden hose or the like (not shown), the faucet and hose thus being put into communication via the bore 23 of tube 19.

A washer 34 may be interposed between the upper face of flange 16 and the end of the faucet tip, to provide a watertight joint, and the container may be screwed onto the faucet in a manner to engage top wall 12 with faucet flange 35, thus insuring rigidity of mounting, though obviously the container may easily be wilfully unscrewed from the faucet.

When faucet 32 is open, water flows in the direction of the arrows in Fig. 1. As the stream approaches the lower end of tube 19, a certain amount of water flows through ports 28 into chamber 22 and rises through the body F of chemical crystals or grains. In rising through the crystalline or granular chemical, the water dissolves particles of the chemical substance so the water W, which finally gathers above the chemical body, represents a supply of chemical solution.

As the main water stream passes through restriction 26, its velocity is increased and its pressure reduced, within the low pressure zone Z of the tube bore, to an extent which draws into the tube bore 19, through ports 27, chemical solution from supply W. This solution joins the main body of the stream flowing through tube 19, so that the finally delivered stream represents a greatly diluted solution of the chemical. While the major portion of this diluted chemical is directly delivered to neck-bore 24 and thence to the distributing medium (not shown) a certain amount of it will be recirculated through chamber 22, for some of it will reenter said chamber through ports 28. However, such re-circulation has no harmful effect.

The described liquid flow through the apparatus causes an even distribution of chemical within the water stream, with a consequent assurance that the chemical may be evenly distributed to the lawn or other surface being treated.

It is obvious that the container may be quickly and easily connected to and disconnected from faucet 32 and coupling 33, so little time and effort is required to install the fertilizing apparatus and then, after completion of the operation, to restore the water line to its normal condition.

Fig. 3 shows a different type of diametrical restriction for the bore 23 of tube 19a, the tube otherwise being similar to tube 18 in Fig. 1. Here, tube 19a is of uniform internal diameter throughout its length, and the restriction is formed by the introduction of a separately fabricated nozzle 40. This nozzle has a cylindrical body-portion 41 snugly fitting bore 23, a flange portion 42 which extends over and may be secured to the upper face of flange 16, and a downwardly pointing conical portion or tip 43. The nozzle bore 44 is concentric with bore 23 and the nozzle orifice 45 is about at the horizontal plane of tube ports 27. Preferably, orifice 45 is slightly below ports 27, but, in any event, opens to the low pressure zone Za. The liquid flow and action are the same as described in connection with Fig. 1.

In Fig. 4 I have shown a variational assembly of elements. Here, casing neck 17 is replaced by extending tube 19a downwardly through opening 48 in bottom wall 13, the projecting tube-end 17a being threaded at 18a to take a coupling similar to 33. Tube 19a is installed by dropping it through neck 14 and opening 48, tube-flange 20a coming to rest on the top of flange 16. The engaging flanges may then be soldered together, and the joint between tube-end 17a and casing bottom 13 may be annularly soldered at 49.

It will be understood that while I have referred to walls 12 and 13 as upper and lower ends of the casing, and have referred to the tube as extending vertically, these references, as well as similar ones in the claims, are given simply for orientation purposes and are not to be considered as limitative.

While I have illustrated and described preferred embodiments of my invention, it will be understood various changes in design, structure and arrangement may be made without departing from the spirit and scope of the appended claims.

I claim:

1. In a device of the character described, a casing, a vertical tube extending through said casing and defining therewith an annular chamber, means for connecting the upper end of the tube bore to a water supply, the lower end of the tube opening to the exterior of the casing, a diametrical restriction in the tube bore and adapted to create a low pressure zone in said bore when water courses therethrough, there being a port near the restriction and opening from the chamber to the low pressure zone of the tube bore, and there being a port below the first mentioned port and opening from the tube bore to said chamber.

2. In a device of the character described, a casing, a vertical tube extending through said casing and defining therewith an annular chamber, means for connecting the upper end of the tube bore to a water supply, the lower end of the tube opening to the exterior of the casing, a Venturi restriction near the upper end of the tube, there being a port at the restriction and opening from the chamber to the tube bore, and there being a port near the lower end of the tube and opening from the tube bore to said chamber.

3. In a device of the character described, a casing, a vertical tube extending through said casing and defining therewith an annuular chamber, means for connecting the upper end of the tube bore to a water supply, means for connecting the lower end of the tube bore to a discharge line, a Venturi restriction near the upper end of the tube, there being a port at the restriction and opening from the chamber to the tube bore, and there being a port near the lower end of the tube and opening from the tube bore to said chamber.

4. In a device of the character described, a casing, a depressed, internally threaded, tubular neck in one wall of the casing, an externally threaded and tubular neck extending from the opposite wall of the casing and in axial alinement with the first mentioned neck, a tube secured within the casing and extending from neck to neck and with the tube bore in communication with the neck bores, said tube and casing defining an annular chamber between them, a Venturi restriction in the tube near said one wall and there being a port at the restriction and opening from the chamber to the tube bore, and there being a port in the tube near said opposite wall and opening from the tube bore to said chamber.

5. In a device of the character described, a casing, a depressed, internally threaded, tubular neck in one wall of the casing, an inwardly projecting, annular flange on the neck, an externally threaded and tubular neck extending outwardly from the opposite wall of the casing and in axial alinement with the first mentioned neck, a tube within the casing and extending from neck to neck, an annular flange on said tube engaging and secured to the inner face of said flange, a nozzle in said tube bore, an external flange on said nozzle, the flange of the nozzle engaging and being secured to the outer face of said neck-flange, said casing and tube defining an annular chamber between them, there being a port in the tube at a point adjacent the nozzle orifice and opening from the chamber to the tube bore, and there being a port in the tube near the opposite wall of the casing and opening from the tube bore to said chamber.

6. In a device of the character described, a casing, a vertical tube extending through said casing and defining therewith an annular chamber, means for connecting the upper end of the tube bore to a water supply, the lower end of the tube opening to the exterior of the casing, a separately fabricated, downwardly pointing nozzle mounted in the tube bore, there being a port opening from the chamber to the tube bore near the orifice of the nozzle, and there being a port below the first mentioned port and opening from the tube bore to said chamber.

7. In a device of the character described, a casing, a vertical tube extending through said casing and defining therewith an annular chamber, means for connecting the upper end of the tube bore to a water supply, the lower end of the tube opening to the exterior of the casing, a diametrical restriction in the tube bore and adapted to create a low pressure zone in said bore when water courses therethrough, there being a port near the restriction and opening from the chamber to the low pressure zone of the tube bore, and there being a port below the first mentioned port and opening from the tube bore to said chamber, the bore of the tube providing a through passageway between said ports.

RICHARD O. LEWIS.

REFERENCES CITED

The following references are of record in the file of this patent:

UNITED STATES PATENTS

| Number | Name | Date |
|---|---|---|
| 514,253 | Boas | Feb. 6, 1894 |
| 1,907,464 | Terry | May 9, 1933 |
| 2,293,390 | Hengesbach | Aug. 18, 1942 |